United States Patent
Papierok

(10) Patent No.: US 12,541,032 B2
(45) Date of Patent: Feb. 3, 2026

(54) METHOD AND APPARATUS FOR LOCALIZING ROAD USERS

(71) Applicant: Aptiv Technologies AG, Schaffhausen (CH)

(72) Inventor: Sebastian Papierok, Ratingen (DE)

(73) Assignee: Aptiv Technologies AG, Schaffhausen (CH)

( * ) Notice: Subject to any disclaimer, the term of this patent is extended or adjusted under 35 U.S.C. 154(b) by 146 days.

(21) Appl. No.: 18/509,908

(22) Filed: Nov. 15, 2023

(65) Prior Publication Data
US 2024/0159917 A1 May 16, 2024

(30) Foreign Application Priority Data
Nov. 15, 2022 (EP) .................................... 22207577

(51) Int. Cl.
*G01S 19/51* (2010.01)

(52) U.S. Cl.
CPC .................... *G01S 19/51* (2013.01)

(58) Field of Classification Search
None
See application file for complete search history.

(56) References Cited

U.S. PATENT DOCUMENTS

| | | | | |
|---|---|---|---|---|
| 2019/0033465 A1* | 1/2019 | Kido | ............... | G01S 19/40 |
| 2021/0055110 A1* | 2/2021 | Knutson | ............... | G01S 19/40 |
| 2021/0263166 A1* | 8/2021 | Zheng | ............... | G08G 1/0116 |
| 2022/0035051 A1* | 2/2022 | Lacaze | ............... | G01S 19/47 |

OTHER PUBLICATIONS

Extended European Search Report for EP App. No. 22207577.2 dated Mar. 7, 2023, 14 pages.
Fabian De Ponte Müller, "Bayesian Cooperative Relative Vehicle Positioning using Pseudorange Differences" May 5, 2014, IEEE/Ion Position, Location and Navigation Symposium, pp. 433-444.
Suhua Tang, "Cooperative Relative Positioning for Intelligence Transportation System" Nov. 5, 2012, ITS Telecommunications (ITST), 2012 12th International Conference, IEEE, pp. 506-511.
Suhua Tang, "Cooperative Relative Positioning for Intelligence Transportation System" International Journal of Intelligent Transportation System Research, Jun. 10, 2014 2014, vol. 13, No. 3, pp. 131-142, Boston, US.

* cited by examiner

*Primary Examiner* — Peter D Nolan
*Assistant Examiner* — Jacob Kent Besteman-Street
(74) *Attorney, Agent, or Firm* — Miller Johnson

(57) ABSTRACT

A method for localizing a first road user includes receiving a first set of positioning data obtained by a first Global Navigation Satellite System (GNSS) receiver located at the first road user. The method includes receiving second sets of positioning data associated with corresponding second road users. Each second set of positioning data is obtained by a corresponding second GNSS receiver. The method includes, for each second road user, determining a relative position of the second road user with respect to the first road user, based on the first set of positioning data and a corresponding second set of positioning data. Determining the relative position includes evaluating a set of parameters determined based on the first and second sets of positioning data and, in response to one or more parameters being determined as missing, replacing the missing one or more parameters by one or more replacement parameters respectively.

12 Claims, 5 Drawing Sheets

METHOD AND APPARATUS FOR LOCALIZING ROAD USERS

CROSS-REFERENCE TO RELATED APPLICATIONS

This application claims priority to EP App. No. 22 207 577 filed Nov. 15, 2022, the entire disclosure of which is incorporated by reference.

FIELD

The present application relates to the field of localization using a Global Navigation Satellite System (GNSS). More particularly, the present application relates to techniques for localizing road users.

BACKGROUND

Road safety and autonomous driving are important topics in the automotive industry. For some years now, more and more advanced driver assistance systems (ADAS) have been made available. ADAS help to recognize dangerous situations and even actively intervene in the driving situation when the driver has no time to react. For this purpose, surrounding information of a vehicle is collected with the aid of local sensor systems such as radar, lidar and camera. Vehicle-to-vehicle and vehicle-to-infrastructure communication (in short: Car2X communication) can be regarded as another sensor system that operates beyond line-of-sight.

Many Car2X applications require determining positions (i.e., relative positions) of nearby vehicles to recognize dangerous situations. For example, a relative position can be used for estimating a distance between a nearby vehicle and the local vehicle. Based on the estimated distance, advanced driver assistance service can be provided to the driver of the vehicle.

A simple approach to determine a relative position between two vehicles is to calculate a difference between current positions of the two vehicles. A conventional method to obtain a current position is to use a GNSS receiver to obtain an estimated position based on signals from GNSS satellites. Then, the estimated positions are shared among the vehicles, e.g., via Car2X communication, to determine each other's relative positions. However, the estimated position determined by a low-cost GNSS receiver has only an accuracy of a few meters. In highly dynamic road situations, estimated positions determined by a low-cost GNSS receiver are not accurate enough for the determination of relative positions between different road users. On the other hand, precise systems (e.g., the Differential Global Positioning System (DGPS) or the (Real-Time Kinematic) RTK system) are too expensive and not every road user can be equipped with a GNSS receiver capable of using the precise systems.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Currently, different alternative approaches are being developed to improve the accuracy of estimated relative positions of nearby vehicles. One approach is to obtain positioning data from GNSS satellites and determine a relative position based on pseudorange double differences (PRDDs) and using a least squares method. This approach is referred to as a PRDD-based approach in the following.

The PRDD-based approach requires at least four common satellites visible to two road users to determine a relative position between the two road users. Furthermore, by using positioning data from more common satellites (e.g., 5 or more satellites), the accuracy of the estimated relative position can be further improved. However, when using the PRDD-based approach, sometimes one or more satellites might be in non-line-of-sight (NLOS), causing gaps in the positioning data. Gaps in the positioning data reduce the number of usable common satellites and reduce the stability of the estimated relative position along time. As shown in FIG. 1, gaps in the positioning data can cause outliers in the error plot for the estimated relative positions.

One goal of the present disclosure is to provide techniques to improve accuracy of estimated relative positions and thus to improve the stability of the estimated relative positions along time. Further, it is also a goal of the present disclosure to ensure efficiency of the algorithm for improved relative position estimation, so that these techniques can be used in real-time (or almost real-time) to provide real-time (or almost real-time) relative position information to the road user. The term "road user" refers to any entity that participates in a road system, e.g., a vehicle (e.g., a vehicle moving on a road, a vehicle parked at a roadside), a person (e.g., a person riding/driving a vehicle, a person walking on a roadside or crossing a road), an infrastructure unit (e.g., a roadside unit (RSU)), etc.

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a computer-implemented method for localizing one or more road users comprises: receiving a first set of positioning data obtained by a first Global Navigation Satellite System (GNSS) receiver located at the first road user; receiving one or more second sets of positioning data associated with corresponding one or more second road users, each second set of positioning data obtained by a corresponding second GNSS receiver located at a corresponding second road user; determining, for each second road user, a relative position of the second road user with respect to the first road user, based on the first set of positioning data and a corresponding second set of positioning data, wherein the step of determining the relative position comprises: evaluating a set of parameters determined based on the first set of positioning data and the second set of positioning data, and wherein when one or more parameters in the set of parameters are determined as missing, the step of determining the relative position further comprises: replacing the missing one or more parameters by one or more replacement parameters respectively.

In an additional aspect of the disclosure, an apparatus comprises means for receiving a first set of positioning data obtained by a first Global Navigation Satellite System (GNSS) receiver located at the first road user; means for receiving one or more second sets of positioning data associated with corresponding one or more second road users, each second set of positioning data obtained by a corresponding second GNSS receiver located at a corresponding second road user; means for determining, for each second road user, a relative position of the second road user with respect to the first road user, based on the first set of positioning data and a corresponding second set of positioning data, wherein the means for determining the relative position comprises: means for evaluating a set of parameters determined based on the first set of positioning data and the second set of positioning data, and means for replacing the missing one or more parameters by one or more replacement parameters respectively, when one or more parameters in the set of parameters are determined as missing.

In an additional aspect of the disclosure, a computer program comprises instructions which, when the program is executed by a computer, cause the computer to carry out a method in accordance with some aspects of this disclosure.

In an additional aspect of the disclosure, a non-transitory computer-readable medium has program code recorded thereon and the program code includes code for causing an apparatus to perform a method in accordance with some aspects of this disclosure.

Other aspects, features, and aspects will become apparent to those of ordinary skill in the art, upon reviewing the following description of specific aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while aspects may be discussed below as device, system, or method aspects it should be understood that such aspects can be implemented in various devices, systems, and methods.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
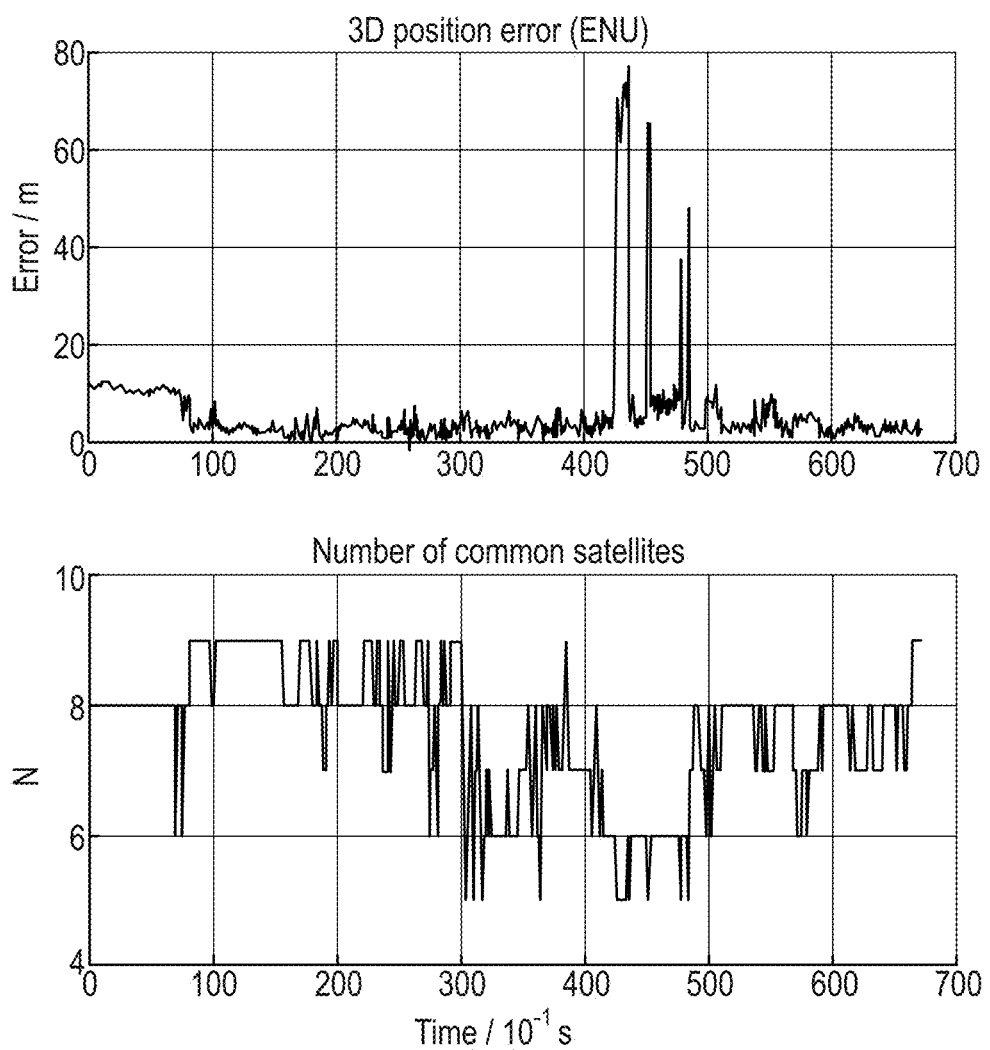
FIG. 1 shows an example of relative position estimation results obtained by a conventional PRDD-based method.

FIG. 1 shows an example of relative position estimation results obtained by a conventional PRDD-based method.

The plot in the first graph shows errors contained in the estimated relative position along time. The errors are obtained by comparing the estimated results with results determined by a precise system (e.g., a DGPS, or an RTK system). The plot in the second graph shows a number of common satellites used for determining the PRDDs.

The outliers in the error plot are caused by NLOS of one or more satellites. When a satellite is visible for a GNSS receiver, it is considered to be in line-of-sight (LOS). Otherwise, if a satellite signal is blocked by an object (e.g., a building, a tree, etc.), the satellite is considered to be in non-line-of-sight (NLOS). Some objects can cause NLOS between the receiver and one or more satellite(s) for a fraction of a second.

Furthermore, a bad satellite geometry can also cause NLOS. The satellites are constantly moving and thus the satellite geometry (the distribution of the satellites on the sky) is constantly changing.

The techniques according to the disclosure can be used to reduce those outliers in the estimated relative position along time. Thus, the stability of the estimation results can be improved.

In the example shown in FIG. 1, it should be mentioned that the number of common satellites between the two road users (for which the relative position is estimated) is always above four. Otherwise, if the number drops below 4, a relative position cannot be determined by a conventional PRDD-based approach.

Figure 2:
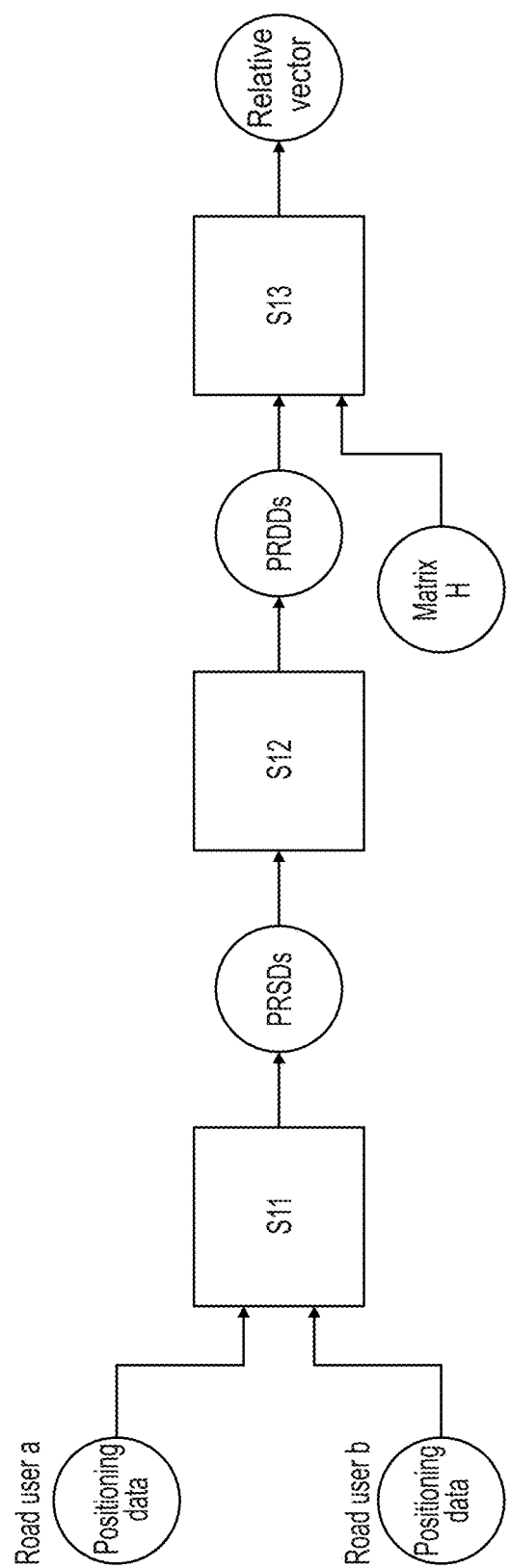
FIG. 2 is a diagram illustrating basic steps in a PRDD-based relative position estimation method.

FIG. 2 is a diagram illustrating basic steps in a PRDD-based relative position estimation method. For simplification, only two road users a and b are shown in this example. The method can be extended to apply to any number of road users to determine relative positions between different pairs of road users.

As shown in FIG. 2, at block S11, a set of pseudorange single differences (PRSDs) are determined based on a set of positioning data obtained for road user a, and a set of positioning data obtained for road user b. For example, a pseudorange single difference $\Delta p_{ab}^{i}$ can be determined as $$\Delta p_{ab}^{i} = p_{a}^{i} - p_{b}^{i}.$$

Here, $p_{b}^{a}$ is a pseudorange measurement for road user a and satellite i, $p_{b}^{i}$ is a pseudorange measurement for road user b and satellite i.

The set of positioning data obtained for road user a is received by a GNSS receiver located at the road user a. The set of positioning data obtained for road user b is received by a GNSS receiver located at the road user b.

In an aspect, the positioning data may comprise "raw data". Each GNSS satellite sends signals with a specific code which is different for each satellite. These codes for different GNSS satellites are known at a GNSS receiver. When a signal arrives at a GNSS receiver, the GNSS receiver calculates measurements (e.g., pseudorange measurements), which are referred to as "raw data".

At block S12, a set of pseudorange double differences (PRDDs) are determined based on the set of PRSDs output by block S11. For example, a pseudorange double difference $\nabla\Delta p_{ab}^{ij}$ between road users a and b and a pair of satellites i and j can be determined as $$\nabla\Delta_{ab}^{ij} = \Delta p_{ab}^{i} - \Delta p_{ab}^{j}.$$

At block S13, a relative vector $r_{ab}$ pointing from the road user a to the road user b or a relative vector $r_{ba}$ pointing from the road user b to the road user a is obtained based on the set of PRDDs output by block S12. For example, the relative vector $r_{ab}$ pointing from the road user a to the road user b can be determined as $$r_{ab} = (H^T H)^{-1} H^T \nabla\Delta p_b.$$

Here, H is a matrix containing differences of LoS unit vectors determined based on positioning data for the road user a. $\nabla\Delta p_{ab}$ is a vector of the set of PRDDs output by block S12.

Alternatively, $r_{ba}$ can be determined in a similar way as the determination of $r_{ab}$, wherein the set of PRDDs is based on $\nabla\Delta p_{ba}$ (similarly determined as $\nabla\Delta p_{ab}$), and the H matrix contains differences of LoS unit vectors determined based on positioning data for the road user b.

In a further aspect, at block S12, a reference satellite is chosen for the determination of the set of PRDDs. For example, the satellite with the highest elevation angle is chosen as the reference satellite, because it is ideally always visible for both road user a and road user b. Then, the $\nabla\Delta p_{ab}$ can be calculated as $$\nabla\Delta p_{ab} = \begin{bmatrix} \Delta p_{ab}^{S_2} - \Delta p_{ab}^{S_1} \\ \Delta p_{ab}^{S_3} - \Delta p_{ab}^{S_1} \\ \vdots \\ \Delta p_{ab}^{S_N} - \Delta p_{ab}^{S_1} \end{bmatrix}.$$

Here, $S_1$ denotes the satellite selected as the reference satellite. $S_2, \ldots, S_N$ denote other common satellites visible for both road user a and road user b.

In a further aspect, the relative vector is obtained by applying a least squares method to solve the equation used at block S13.

In a further aspect, a distance between the road user a and road user b can be obtained based on the relative vector $r_{ab}$ or $r_{ba}$.

In a further aspect, the relative vector/relative position can be used to improve self-localizing of a road user. By using the example shown in FIG. 2, in a case when the road user a has a low-cost GNSS receiver and cannot obtain a precise position with the low-cost GNSS receiver, and the road user b is capable of obtaining a precise position (e.g., the road user b is capable of using a precise GNSS, or the road user b is an infrastructure unit with a known precise position). Then, a precise position of the road user a can be obtained based on the relative vector/relative position and the precise position of the road user b.

The above described PRDD-based method to obtain a relative vector requires a set of PRDDs (denoted by $\nabla\Delta p_{ab}$) containing at least three PRDDs (based on at least four PRSDs and corresponding to positioning data obtained from at least four common satellites). Furthermore, by using positioning data from more common satellites (e.g., 5 or more satellites), the accuracy of the estimated relative position can be improved. However, when using the PRDD-based approach, sometimes one or more satellites might be in non-line-of-sight (NLOS), causing gaps in the positioning data. A missing pseudorange measurement in the positioning data leads to a missing PRSD, a missing PRSD leads to a missing PRDD, and a missing PRDD leads to a gap in the set of PRDDs. The gaps cause errors in the estimated relative position and sometimes lead to outliers in the estimated relative positions, at least based on a conventional PRDD-based approach (as shown with reference to FIG. 1).

The disclosure provides techniques to solve this problem by filling the gap(s) in the pseudorange measurements, in the PRSDs, and/or in the PRDDs. The gap(s) can be filled up by using replacement value(s) provided by a so-called "memory function" or a "prediction function".

For example, when the gap(s) in the pseudorange measurements are at least partially filled up (e.g., at block S11), then, there may be no gap(s) or fewer gap(s) in the PRSDs and subsequently no gap(s) or fewer gap(s) in the PRDDs.

In another example, the gap(s) in the pseudorange measurements are not filled up, but the gap(s) in the PRSDs (resulted from pseudorange measurements with gap(s)) are at least partially filled up (e.g., at block S12), then, there may be no gap(s) or fewer gaps in the PRDDs.

In yet another example, the gap(s) in the pseudorange measurements and the gap(s) in the PRSDs are not filled up, but the gap(s) in the PRDDs are at least partially filled up (e.g., at block S13), so that there may be no gap(s) or fewer gaps in the PRDDs.

Consequently, using the techniques provided by the disclosure may achieve a set of PRDDs with no gap(s) or fewer gaps. An improvement in the PRDD results leads to improvement in the estimated relative vector/relative position. Thus, an improvement in the stability of the estimation results can be achieved.

In the following, an example is described in more detail to explain the techniques disclosed herein. In this example, the gap(s) in the pseudorange measurements and the PRSDs are not filled up, but the gap(s) in the PRDDs are at least partially filled up (e.g., at block S13). A so-called "memory function" is applied to fill the gap(s) in the PRDDs.

Figure 3:
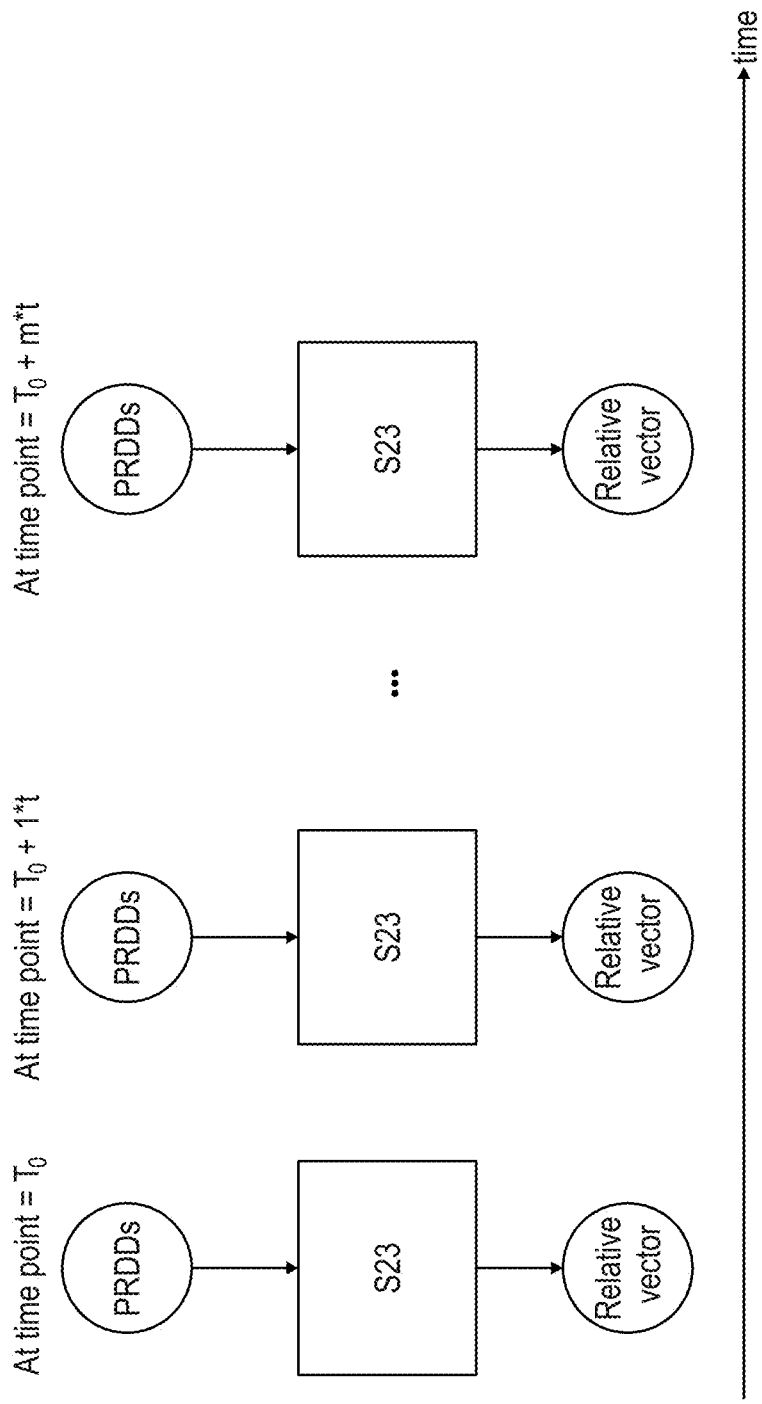
FIG. 3 illustrates a method to determine a relative vector along time based on PRDDs.

FIG. 3 illustrates a method to determine a relative vector based on PRDDs. The relative vector is determined by using a similar method as described with reference to FIG. 2. As shown in FIG. 3, the determination of the relative vector is repeated at time points $T_0, T_0+1*t, \ldots, T_0+m*t$, whereby $T_0$ is the start time, t represents an increment in time, m is a positive integer number. In another word, the determination of the relative vector is repeated at a frequency of $1/t$. For example, when t is 10 ms, the frequency is 1/10 ms, which equals 100/s.

The "memory function" in this example is applied to store all the PRDDs validly determined in the past. The term "validly determined" means that the determination is based on pseudorange measurements without gap(s).

For example, at a time point $T_0+p*t$ (whereby p is a positive integer number), one or more pseudorange measurements are missing (e.g., due to NLOS of one or more satellites), resulting in gap(s) in the initially determined set of PRDDs obtained from block S12 (i.e., resulting in missing PRDD(s)). Replacement value(s) for the missing PRDD(s) can be obtained by using the "memory function" to find out the last validly determined set of PRDD(s). For example, the last validly determined set of PRDD(s) were determined at time point $T_0+q*t$ (whereby q is a positive integer number which is smaller than p). Then, the initially determined set of PRDDs can be modified by filling the gap(s) with the replacement value(s). Consequently, at block S23, the modified set of PRDDs may be used for the determination of the relative vector.

As can be seen, by using the "memory function", the relative vector may be determined based on an improved set of PRDDs. As a result, outliers in the estimation of relative vector along time can be suppressed and the stability of the estimation results can be improved.

In an aspect, the positioning data for the road users contains timestamp information, which can be used to synchronize the positioning data for different road users.

In another aspect, the positioning data may be exchanged via C2X communications, Wi-Fi, G5, G6 or any other new technologies.

In a further aspect, when a certain set of pseudorange measurements continues to be missing for an amount of time, for all the involved time points within this amount of time, the last validly determined PRDD(s) can be used as the replacement value(s) to fill the gaps in the PRDD(s).

In a further aspect, the amount of time should be under a threshold amount of time, so that additional errors introduced by using the replacement value(s) are maintained at an acceptable level. In the situation when the road user is traveling along a road, the NLOS caused by an object (e.g., a building or a tree) is generally within a fraction of a second, which may not result in significant errors in the estimated relative position, when the "memory function" is applied. As an example, one second (i.e., 1000 ms) can be set as a threshold amount of time to apply the "memory function". An exact time duration of NLOS may be dependent on the size of the building and the velocity of the road user.

In a further aspect, when a certain set of pseudorange measurements continues to be missing for an amount of time that is longer than a threshold amount of time, the "memory function" would introduce too much additional error. Therefore, in this situation, the threshold amount of time can be used as a parameter to decide when the "memory function" should be aborted. Furthermore, an indication can be sent to the affected road user informing e.g., that no reliable positioning assistance can be provided at the moment due to NLOS.

In a further aspect, a so-called "prediction function" can be used instead of the "memory function" to reduce the potential additional errors introduced by the "memory function". The "prediction function" is more sophisticated compared to the "memory function". Using the same example as described with reference to FIG. 3, the "prediction function" can be utilized to derive replacement value(s) for the missing PRDD(s) based on historical PRDDs and a motion model of the road user whose pseudorange measurement(s) is/are missing. The motion model can use parameters (e.g., velocity, heading, or steering wheel angle) to determine dynamics of the road user and predicts a current position of the road user.

In a further aspect, the techniques disclosed herein can also be used to process the LoS unit vectors and/or the differences of LoS unit vectors (contained in the matrix H). For example, for the determination of a relative vector $r_{ab}$ pointing from the road user a to the road user b, the matrix H containing differences of LoS unit vectors obtained from positioning data for the road user a is applied. When one or more pseudorange measurements is/are missing in the positioning data for the road user a, gap(s) may result in the LoS unit vectors, the differences of LoS unit vectors and the matrix H.

By using similar techniques disclosed herein, gap(s) in the LoS unit vectors, the differences of LoS unit vectors and/or the matrix H can be at least partially filled up, which results in an improved matrix H. An improved matrix H leads to further improvement in the estimated relative position. Thus, the stability of the method to determine the relative vector can be further improved.

In the following, a more detailed example is shown to explain how to apply a "memory function" to process the differences of LoS unit vectors to improve the matrix H.

Referring to the example shown in FIG. 3, the determination of the relative vector is repeated at time points $T_0$, $T_0+1*t$, ..., $T_0+m*t$. At each time point, a line of sight (LoS) unit vector $e_a^i$ pointing from the road user a to a satellite i is determined with respect to each of the visible/used satellites. The determination of the LoS unit vector is based on the positioning data for the road user a.

Then, differences of the LoS unit vectors are determined for pairs of LoS unit vectors. The matrix H contains the determined differences of the LoS unit vectors.

As described above with reference to FIG. 2, a reference satellite $S_1$ can be selected, so that, for example, the matrix H can be calculated as:

$$H = \begin{bmatrix} e_{a,x}^{S_2} - e_{a,x}^{S_1} & e_{a,y}^{S_2} - e_{a,y}^{S_1} & e_{a,z}^{S_2} - e_{a,z}^{S_1} \\ e_{a,x}^{S_3} - e_{a,x}^{S_1} & e_{a,y}^{S_3} - e_{a,y}^{S_1} & e_{a,z}^{S_3} - e_{a,z}^{S_1} \\ \vdots & \vdots & \vdots \\ e_{a,x}^{S_N} - e_{a,x}^{S_1} & e_{a,y}^{S_N} - e_{a,y}^{S_1} & e_{a,z}^{S_N} - e_{a,z}^{S_1} \end{bmatrix}.$$

Here, $e_a^{S_i}$ is a line of sight (LoS) unit vector pointing from the road user a to the satellite $S_i$. Here, $S_i$ denotes the satellite selected as the reference satellite. $S_2$, ..., $S_N$ denote other common satellites visible for both road user a and road user b.

When, similarly as discussed with the example referring to FIG. 3, at a time point $T_0+p*t$, pseudorange measurement(s) is/are missing in the positioning data of the road user a, the LoS unit vectors may have gap(s). Gap(s) in the LoS unit vectors may cause gap(s) in the differences of the LoS unit vectors and consequently gaps(s) in the matrix H. Since the LoS unit vectors are in general determined based on the position of a corresponding road user, a missing pseudorange measurement may not always lead to a missing LoS vector.

A "memory function" can be similarly implemented to fill the gap(s) in the LoS unit vectors, differences of the LoS unit vectors and/or the matrix H.

For example, replacement value(s) for the missing LoS unit vector(s) can be obtained by using the "memory function" to find out the last validly determined set of LoS unit vector(s). For example, the last validly determined set of LoS unit vector(s) were determined at time point $T_0+q*t$. Then, the initially determined set of LoS unit vectors can be modified by filling the gap(s) by using the replacement value(s). Consequently, by using the modified set of LoS unit vectors, there may be no gap(s) or fewer gap(s) in the differences of the LoS unit vectors and there may be no gap(s) or fewer gap(s) in the matrix H.

In a further aspect, when pseudorange measurement(s) for road user a is/are missing, a "prediction function" can be used to predict the missing LoS unit vector(s) by using a motion model for road user a. The motion model can use parameters (e.g. velocity, heading, or steering wheel angle) to determine dynamics of the moving road user a. Based on the motion model, a current position of the road user a can be predicted and the LoS unit vectors can be determined based on the predicted current position of the road user a.

In a further aspect, measurements from an Inertial Measurement Unit (IMU) can be used to predict a current position of the road user a and the LoS unit vectors can be determined based on the predicted current position of the road user a.

Figure 4:
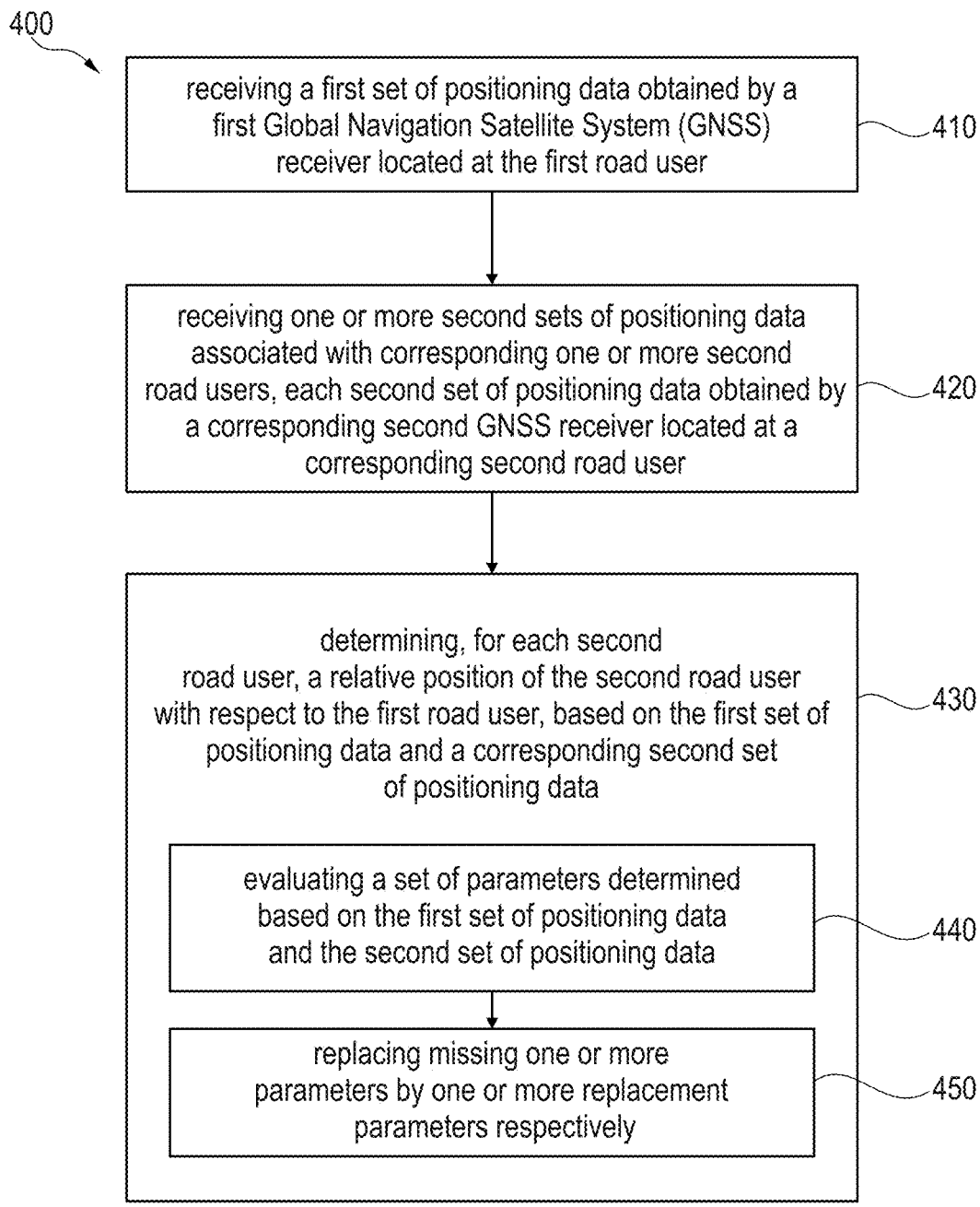
FIG. 4 illustrates a flow diagram of a relative position estimation method according to some aspects of the disclosure.

FIG. 4 illustrates a flow diagram of a relative position estimation method 400 according to some aspects of the disclosure. Steps of the method 400 can be executed by a computing device (e.g., a processor, processing circuit, and/or other suitable component) or other suitable means for performing the steps. As illustrated, the method 400 includes a number of enumerated steps, but aspects of the method 400 may include additional steps before, after, and in between the enumerated steps.

At block 410, the device receives a first set of positioning data obtained by a first Global Navigation Satellite System (GNSS) receiver located at the first road user.

At block 420, the device receives one or more second sets of positioning data associated with corresponding one or more second road users, each second set of positioning data obtained by a corresponding second GNSS receiver located at a corresponding second road user.

At block 430, the device determines, for each second road user, a relative position of the second road user with respect to the first road user, based on the first set of positioning data and a corresponding second set of positioning data.

Furthermore, block 430 comprises step 440 and step 450.

At step 440, the device evaluates a set of parameters determined based on the first set of positioning data and the second set of positioning data.

When one or more parameters in the set of parameters are determined as missing, at step 450, the device replaces the missing one or more parameters by one or more replacement parameters respectively.

Here, block 430 applies similar techniques disclosed for blocks S11, S12, S13 of FIGS. 2 and S23 of FIG. 3.

In an aspect, the set of parameters can refer to the set of pseudorange single differences (PRSDs), the set of pseudorange double differences (PRDDs), the set of line of sight (LoS) unit vectors, and/or the set of differences of LoS unit vectors.

In a further aspect, the "memory function" or the "prediction function" disclosed herein can be used to determine the one or more replacement parameters.

In a further aspect, the positioning data may comprise pseudorange measurement data.

In a further aspect, the positioning data may comprise timestamp information.

In a further aspect, block 430 may include steps of determining a set of pseudorange single differences (PRSDs) based on the first set of positioning data and the second set of positioning data (similar as S11 of FIG. 2); determining a set of pseudorange double differences (PRDDs), based on the set of PRSDs (similar as S12 of FIG. 2); determining a matrix containing a set of differences of line of sight (LoS) unit vectors, the LoS unit vectors associated with the first road user; and determining the relative position of a second road user based on the matrix and the set of PRDDs (similar as S13 of FIG. 2 or S23 of FIG. 3).

In a further aspect, block 440 may include a step of evaluating the set of PRSDs, the set of PRDDs and/or the set of differences of LoS unit vectors.

In a further aspect, the missing one or more parameters may comprise missing one or more PRSDs, missing one or more PRDDs and/or missing one or more differences of LoS unit vectors.

In a further aspect, block 450 may include a step of replacing the missing one or more PRSDs by one or more replacement PRSDs respectively, replacing the missing one or more PRDDs by one or more replacement PRDDs respectively, and/or replacing the missing one or more differences of LoS unit vectors by one or more replacement differences of LoS unit vectors respectively.

In a further aspect, the one or more replacement PRSDs are obtained by evaluating historical PRSDs, which have been determined prior to the step of determining a current set of PRSDs, wherein the one or more replacement PRDDs are obtained by evaluating historical PRDDs, which have been determined prior to the step of determining a current set of PRDDs, and/or wherein the one or more replacement differences of LoS unit vectors are obtained by evaluating historical differences of LoS unit vectors, which have been determined prior to the step of determining a current set of differences of LoS unit vectors.

In a further aspect, the one or more replacement PRSDs may be obtained from a previous set of PRSDs, which have been successfully determined prior to the step of determining a current set of PRSDs, wherein the one or more replacement PRDDs are obtained from a previous set of PRDDs, which have been successfully determined prior to the step of determining a current set of PRDDs, and/or wherein the one or more replacement differences of LoS unit vectors are obtained from a previous set of differences of LoS unit vectors, which have been successfully determined prior to the step of determining a current set of differences of LoS unit vectors.

In a further aspect, the method 400 may include a step of aborting the step of replacing the missing one or more parameters, when the one or more parameters in the set of parameters are determined as missing for a continuous amount of time greater than a threshold amount of time.

In a further aspect, the method 400 may comprise a further step of determining a distance between the first road user and the second road user based on the relative position. Further, the method 400 may comprise a step of sending a warning signal to the first road user and/or the second road user, when the distance is below a threshold distance. In a further aspect, the device is located at the road user a. In a further aspect, the device is located in a cloud system.

Figure 5:
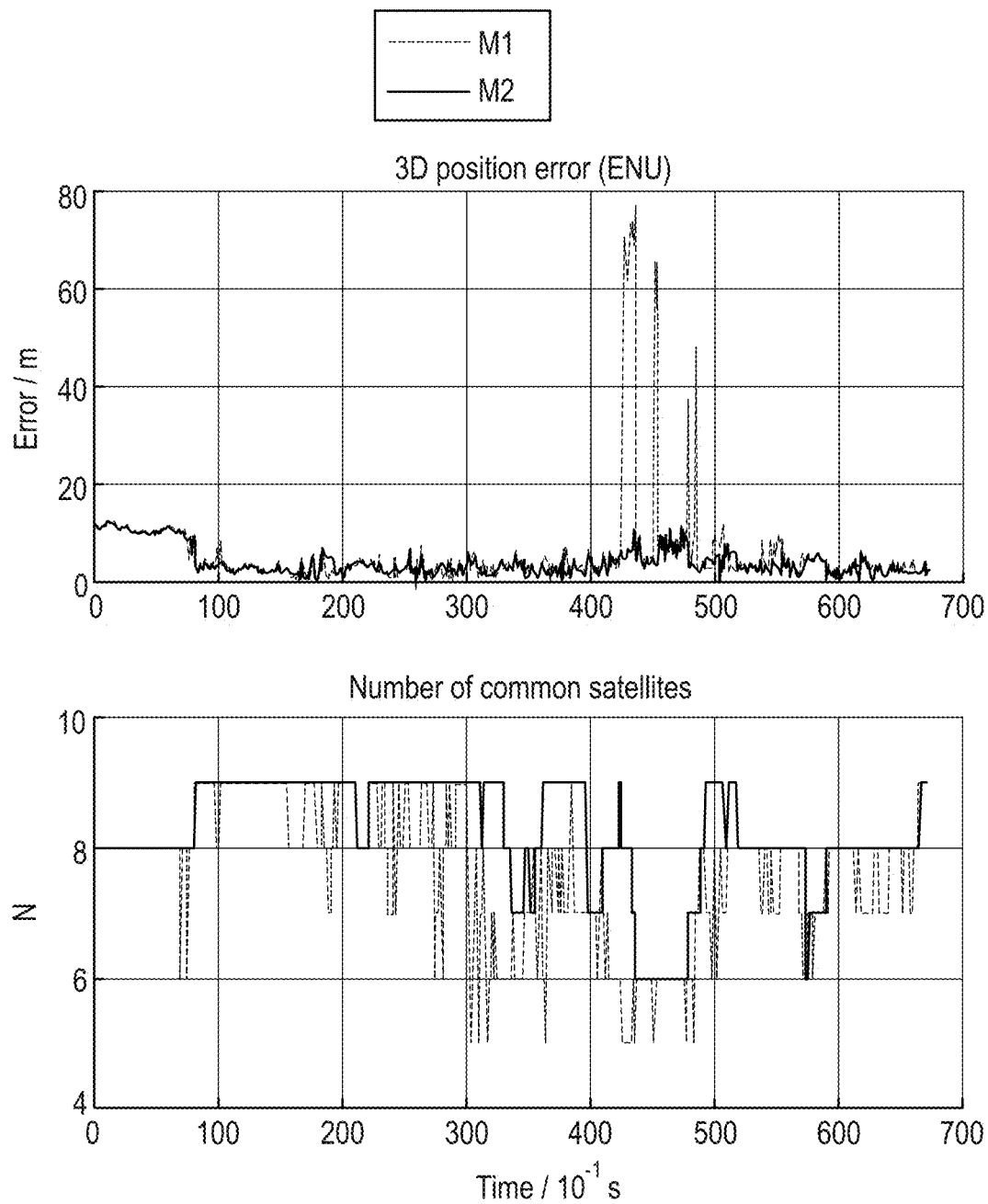
FIG. 5 shows a comparison between an example of relative position estimation results obtained by a conventional PRDD-based method and an example of relative position estimation results obtained by a method according to some aspects of the disclosure.

FIG. 5 shows a comparison between an example of relative position estimation results obtained by a conventional PRDD-based method and an example of relative position estimation results obtained by a method according to some aspects of the disclosure. The line labeled as "M1" represents the results from a conventional PRDD-based approach, and the line labeled as "M2" represents the results by using a method according to some aspects of the disclosure. In the example method used for M2, a "memory function" is applied to fill the gaps in the PRDDs, a threshold amount of time is set as 1000 ms.

In FIG. 5, similarly as shown in FIG. 1, the plots in the first graph show errors contained in the estimated relative position along time. The errors are obtained by comparing the estimated results with results determined by a precise system (e.g., a DGPS, or an RTK system). The outliers in the plot of M1 are caused by NLOS of one or more satellites. The plot of M2 does not have those outliers shown in the plot of M1.

Further in FIG. 5, similarly as shown in FIG. 1, the plots in the second graph show a number of common satellites used in the determination of the PRDDs. A comparison of the plots in the second graph shows that, by using the method according to some aspects of the disclosure, a number of common satellites used in the determination of the PRDDs can be increased in comparison to the conventional PRDD-based method.

Therefore, by using the techniques according to the disclosure, outliers in the estimated relative position are significantly reduced. Thus, the stability of the estimation results can be significantly improved.

It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A computer-implemented method for advanced driver assistance, the method comprising:
  receiving a first set of positioning data obtained by a first Global Navigation Satellite System (GNSS) receiver located at a first road user;
  receiving one or more second sets of positioning data associated with corresponding one or more second road users, wherein each second set of positioning data is obtained by a corresponding second GNSS receiver located at a corresponding second road user;
  for each second road user, determining a relative position of the second road user with respect to the first road user, based on the first set of positioning data and a corresponding second set of positioning data, wherein:
    the first set of positioning data and the corresponding second set of positioning data includes pseudorange measurement data,
    determining the relative position includes:
      evaluating a set of parameters determined based on the first set of positioning data and the second set of positioning data,
      in response to one or more parameters in the set of parameters being determined as missing, replacing the missing one or more parameters by one or more replacement parameters respectively,
      determining a set of pseudorange single differences PRSDs) based on the first set of positioning data and the second set of positioning data,
      determining a set of pseudorange double differences (PRDDs) based on the set of PRSDs,
      determining a matrix including a set of differences of line of sight (LoS) unit vectors, wherein the LoS unit vectors are associated with the first road user, and
      determining the relative position based on the matrix and the set of PRDDs, and
    evaluating the set of parameters includes evaluating at least one of the set of PRSDs, the set of PRDDs, or the set of differences of LoS unit vectors; and
  in response to the relative position of a second road user being below a distance threshold, providing an advanced driver assistance service to the first road user to inhibit the first road user from crashing into the second road user.

2. The method of claim 1 wherein the positioning data includes timestamp information.

3. The method of claim 1 wherein the missing one or more parameters includes at least one of:
  missing one or more PRSDs,
  missing one or more PRDDs, or
  missing one or more differences of LoS unit vectors.

4. The method of claim 3 wherein replacing the missing one or more parameters includes replacing at least one of:
  the missing one or more PRSDs by one or more replacement PRSDs respectively, the missing one or more PRDDs by one or more replacement PRDDs respectively, or the missing one or more differences of LoS unit vectors by one or more replacement differences of LoS unit vectors respectively.

5. The method of claim 4 wherein replacing the missing one or more parameters includes at least one of:
obtaining the one or more replacement PRSDs by evaluating historical PRSDs that have been determined prior to determining a current set of PRSDs,
obtaining the one or more replacement PRDDs by evaluating historical PRDDs that have been determined prior to determining a current set of PRDDs, or
obtaining the one or more replacement differences of LoS unit vectors by evaluating historical differences of LoS unit vectors that have been determined prior to determining a current set of differences of LoS unit vectors.

6. The method of claim 5 wherein replacing the missing one or more parameters includes at least one of:
obtaining the one or more replacement PRSDs from a previous set of PRSDs that have been successfully determined prior to determining a current set of PRSDs,
obtaining the one or more replacement PRDDs from a previous set of PRDDs that have been successfully determined prior to determining a current set of PRDDs, or
obtaining the one or more replacement differences of LoS unit vectors from a previous set of differences of LoS unit vectors that have been successfully determined prior to determining a current set of differences of LoS unit vectors.

7. The method of claim 6 further comprising, in response to the one or more parameters in the set of parameters being determined as missing for a continuous amount of time greater than a threshold amount of time, aborting replacing the missing one or more parameters.

8. The method of claim 7 further comprising, for each second road user, determining a distance between the first road user and the second road user based on the relative position.

9. The method of claim 8 further comprising, for each respective second road user, in response to the distance being below a threshold distance, sending a warning signal to at least one of (i) the first road user or (ii) the respective second road user.

10. An apparatus comprising:
a computer-readable medium storing instructions; and
at least one processor configured to execute the instructions, wherein the instructions include:
receiving a first set of positioning data obtained by a first Global Navigation Satellite System (GNSS) receiver located at a first road user;
receiving one or more second sets of positioning data associated with corresponding one or more second road users, wherein each second set of positioning data is obtained by a corresponding second GNSS receiver located at a corresponding second road user;
for each second road user, determining a relative position of the second road user with respect to the first road user, based on the first set of positioning data and a corresponding second set of positioning data, wherein:
the first set of positioning data and the corresponding second set of positioning data includes pseudorange measurement data,
determining the relative position includes:
evaluating a set of parameters determined based on the first set of positioning data and the second set of positioning data,
in response to one or more parameters in the set of parameters being determined as missing, replacing the missing one or more parameters by one or more replacement parameters respectively,
determining a set of pseudorange single differences (PRSDs) based on the first set of positioning data and the second set of positioning data,
determining a set of pseudorange double differences (PRDDs) based on the set of PRSDs,
determining a matrix including a set of differences of line of sight (LoS) unit vectors, wherein the LoS unit vectors are associated with the first road user, and
determining the relative position based on the matrix and the set of PRDDs, and
evaluating the set of parameters includes evaluating at least one of the set of PRSDs, the set of PRDDs, or the set of differences of LoS unit vectors; and
in response to the relative position of a second road user being below a distance threshold, providing an advanced driver assistance service to the first road user to inhibit the first road user from crashing into the second road user.

11. The apparatus of claim 10 wherein the apparatus is located at the first road user or in a cloud system.

12. A non-transitory computer-readable medium comprising instructions including:
receiving a first set of positioning data obtained by a first Global Navigation Satellite System (GNSS) receiver located at a first road user;
receiving one or more second sets of positioning data associated with corresponding one or more second road users, wherein each second set of positioning data is obtained by a corresponding second GNSS receiver located at a corresponding second road user;
for each second road user, determining a relative position of the second road user with respect to the first road user, based on the first set of positioning data and a corresponding second set of positioning data, wherein:
the first set of positioning data and the corresponding second set of positioning data includes pseudorange measurement data,
determining the relative position includes:
evaluating a set of parameters determined based on the first set of positioning data and the second set of positioning data,
in response to one or more parameters in the set of parameters being determined as missing, replacing the missing one or more parameters by one or more replacement parameters respectively,
determining a set of pseudorange single differences (PRSDs) based on the first set of positioning data and the second set of positioning data,
determining a set of pseudorange double differences (PRDDs) based on the set of PRSDs,
determining a matrix including a set of differences of line of sight (LoS) unit vectors, wherein the LoS unit vectors are associated with the first road user, and
determining the relative position based on the matrix and the set of PRDDs, and evaluating the set of parameters includes evaluating at least one of the set of PRSDs, the set of PRDDs, or the set of differences of LoS unit vectors; and in response to the relative position of a second road user being below a distance threshold, providing an advanced driver assistance service to the first road user to inhibit the first road user from crashing into the second road user.

\* \* \* \* \*